(12) United States Patent
Malreddy et al.

(10) Patent No.: US 9,319,872 B1
(45) Date of Patent: Apr. 19, 2016

(54) METHOD FOR ALLOCATING COVERAGE AREA IDENTIFIERS AMONG NEARBY BASE STATIONS

(71) Applicant: Sprint Spectrum L.P., Ovelrand Park, KS (US)

(72) Inventors: Muralidhar Malreddy, Overland Park, KS (US); Ryan S. Talley, Overland Park, KS (US); Julio C. Costa, Tampa, FL (US); Shilpa Kowdley Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 44 days.

(21) Appl. No.: 14/276,573

(22) Filed: May 13, 2014

(51) Int. Cl.
*H04W 36/00* (2009.01)
*H04W 8/26* (2009.01)

(52) U.S. Cl.
CPC ...................................... *H04W 8/26* (2013.01)

(58) Field of Classification Search
None
See application file for complete search history.

(56) References Cited

U.S. PATENT DOCUMENTS

| 2009/0156210 | A1* | 6/2009 | Ponce De Leon | .... H04W 36/30 455/436 |
| 2009/0311966 | A1* | 12/2009 | Stapleton | ............... H04W 24/08 455/67.11 |
| 2010/0197309 | A1* | 8/2010 | Fang | ...................... H04W 36/04 455/436 |
| 2010/0322107 | A1* | 12/2010 | Nagano | ............. H04W 36/0083 370/254 |
| 2011/0143812 | A1* | 6/2011 | Ogawa | ..................... H04W 8/26 455/561 |
| 2012/0329461 | A1* | 12/2012 | Teyeb | ............... H04W 36/0061 455/437 |
| 2013/0172031 | A1* | 7/2013 | Calippe | .................... H04W 8/26 455/509 |
| 2015/0117403 | A1* | 4/2015 | Kubota | ................... H04W 8/02 370/331 |

* cited by examiner

*Primary Examiner* — Kimberly A Williams (57) ABSTRACT

A method for configuring a first base station to use a coverage area identifier is described. For instance, a computing system may determine that coverage provided by the first base station overlaps with coverage provided by a second base station. Further, of a plurality of third base stations that also provide coverage overlapping the coverage provided by the second base station, the computing system may identify one or more third base stations having an extent of handover with the determined second base station that is below a threshold extent of handover. The computing system may then select, as the coverage area identifier to be assigned to the first base station, a coverage area identifier that is also assigned to a particular one of the one or more identified third base stations. The computing system may configure the first base station to use the selected coverage area identifier.

20 Claims, 6 Drawing Sheets

METHOD FOR ALLOCATING COVERAGE AREA IDENTIFIERS AMONG NEARBY BASE STATIONS

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which wireless communication devices (WCDs) (also known as user equipment devices (UEs), whether or not operated by an end-user), such as cell phones, tablet computers, tracking devices, embedded wireless modules, and other wirelessly equipped communication devices, can operate. (In practice, a given cell site may include an antenna structure and associated equipment that is arranged as multiple such base stations, each radiating to define a respective coverage area.) In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

To provide robust wireless coverage across a given geographic area, a wireless service provider typically operates, in the geographic area, numerous base stations that each provide wireless coverage that overlaps with wireless coverage provided by one or more other base stations. These base stations may include a combination of macro base stations (typically designed to cover a wide geographic area and provide service generally) and small-cell base stations, such as femtocells (typically designed to cover a limited geographic area and provide service to a particular subscriber or group of subscribers). This combination of base stations may then provide wireless coverage over a broad area via a plurality of fully or partially overlapping coverage areas.

Base stations having overlapping wireless coverage with one another may be referred to as neighbors. For instance, in an example wireless network, a first base station may have as a neighbor a second base station having overlapping wireless coverage with the first base station. Then, as its neighbors, the second base station may have the first base station and one or more third base stations. The one or more third base stations may each provide respective wireless coverage that overlaps with the wireless coverage of the second base station. The degree of wireless coverage overlap between the neighboring base stations may vary over time as changing environmental conditions, network configurations, and other factors alter signal propagation. WCDs operating in the geographic area may hand over between overlapping wireless coverage (as provided by neighboring base stations) to maintain air interface communication with the network as they move from location to location.

For the purpose of identification, a cellular wireless network may assign a coverage area identifier to each coverage area within the cellular wireless network. Base stations and WCDs may indicate particular coverage areas by reference to their respective assigned coverage area identifiers. For instance, a base station may emit a pilot signal indicating a particular coverage area identifier that has been assigned to the base station. A WCD may detect the broadcasted pilot signal and then request to operate in the coverage of the base station by referencing, in a handover request, the particular coverage area identifier. The base station receiving the handover request may then facilitate hand over of the WCD via one or more communications with the base station indicated in the handover request.

Since there are a limited number of unique identifiers, coverage area identifiers are typically re-used within the cellular wireless network. Such re-use of coverage area identifiers may, however, cause an issue known as identifier conflict. In particular, identifier conflict may occur when two base stations having the same coverage area identifier are near enough to one another geographically that the coverage area identifier is ambiguous (in that a reference to the coverage area identifier could refer to either of the two base stations).

In an effort to prevent identifier conflict, the cellular wireless network typically assigns different coverage area identifiers to nearby base stations. For instance, in the example cellular network noted above, the first base station may receive a coverage area identifier that is different from any of its neighbors (e.g., the second base station). Since the first and second base station provide overlapping wireless coverage, assigning the same coverage area to these base stations may cause frequent ambiguity. Further, the first base station may receive a coverage area identifier that is different from any neighbor of the second base station (e.g., the one or more third base stations). Then, in operation, the second base station may distinguish between the first base station and the one or more third base stations using their different identifiers.

However, in some circumstances, unique coverage area identifiers may be unavailable to all base stations in a given geographic area. For example, deployment of a large number of closely-located base stations (such as may serve a densely-populated area) may exhaust the unique coverage area identifiers available for assignment and necessitate re-use of one or more coverage area identifiers among nearby base stations. As another example, deployment of multiple femtocells (or other small-cells) within the wireless coverage area of a macro base station may necessitate re-using coverage area identifiers among the multiple femtocells. In the example cellular network noted above, such deployments may necessitate assigning the same coverage area to the first base station as is presently assigned to a nearby base station (e.g., the second base station or one of the third base stations). Such identifier re-use may result in identifier conflict.

Overview

As noted above, some deployments of base stations within the example cellular network may necessitate assigning the same coverage area identifier to the first base station as is presently assigned to a nearby base station (e.g., the second base station or the one or more third base stations). Within such a deployment, the issue may then be which identifier to assign to the first base station. Among the presently-assigned identifiers, certain identifiers may be less likely to cause identifier conflict when assigned to the first base station. In particular, these identifiers may be presently assigned to one or more particular third base stations. In operation, handover between the one or more particular third base stations and the second base station may tend to be relatively infrequent. Given the relatively small tendency of handover between the second base station and the particular third base station(s), assigning to the first base station the same identifier that is currently assigned to one of the third base stations would be unlikely to cause identifier conflict from the perspective of the second base station, since the second base station could reasonably conclude that a handover request specifying that identifier refers to the first base station rather than to the third base station.

Disclosed herein is a method and system to facilitate selecting, for a first base station, a particular coverage area identifier from among the identifiers presently assigned to nearby base stations. For example, the cellular network (or a component thereof) may determine at least one neighbor of the first base station, such as by determining that coverage provided by the first base station overlaps with coverage provided by the second base station. Then, among the one or more third base stations that neighbor the second base station, the cellular network may determine a particular third base station that is unlikely to act as a source or a target for a handover involving the second base station. The cellular network may then assign to the first base station the same coverage area identifier as assigned to the particular third base station. Then, in operation, the second base station may assume that the identifier refers to the first base station since WCDs were unlikely to reference the identifier of the particular third base station in handover requests to the second base station.

The cellular network may evaluate likelihood of handover between the particular third base station and the second base station using a variety of different metrics. For instance, evaluation of a record of handover history of the particular third base station may reveal an extent of handover between the particular third base station and the second base station that is less than a certain threshold. Further, evaluation of handover histories of other third base stations that neighbor second base station may reveal that, among these third base stations, the particular third base station has the lowest extent of handover with the second base station. Alternatively, the geographic distance between the particular third base station and the second base station may indicate that handover between the two base stations is more or less likely. In some cases, the cellular network may evaluate likelihood of handover between the particular third base station and the second base station based on a combination of factors that, individually or in combination, indicate likelihood of handover between the particular third base station and the second base station.

The disclosed method and system may have application to small-cell base stations, such as femtocells. As noted above, femtocells, by design, serve a limited geographic area, such as a home or office. Because of this design characteristic, many femtocells, each providing a respective wireless coverage area, may come to be positioned near one another in a given geographic area. A macro base station in that geographic area may then provide wireless coverage that overlaps the wireless coverage areas of multiple femtocells. As WCDs enter or leave the limited geographic area served by a given femtocell, they may hand over between the femtocell and the macro base station. Assigning different coverage area identifiers to each of the femtocells that are within the wireless coverage of the macro base station may assist the macro base station in distinguishing among the femtocells during handover.

However, in some cases, there may not be sufficient unique identifiers for each femtocell that is within the wireless coverage of a macro base station. As noted above, femtocells within a given geographic area may be densely-packed, such that a macro base station may have a large number of femtocells within its wireless coverage. Further, a cellular wireless network may designate for assignment to femtocells a subset of the total coverage area identifiers available, which may leave a limited number of unique coverage area identifiers for assignment to femtocells. Some deployments of femtocells may therefore necessitate the re-use of identifiers among femtocells that are within the wireless coverage of a macro base station.

On the other hand, a given femtocell may be within the wireless coverage of more than one macro base station. Further, WCDs may tend to hand over from the given femtocell to a particular macro base station less often than other macro base stations. The cellular network may evaluate these tendencies and use them to reduce the incidence of identifier conflict by application of the present method and system.

This method could be carried out by any of a variety of entities, including for instance the intermediate base station itself or perhaps a network controller such as a mobility management entity (MME), base station controller (BSC), or mobile switching center (MSC). Further, the method can be carried out automatically whenever a change in network configuration occurs, such as when new base stations are added to a given cellular wireless network or when changing environmental conditions, customer usage patterns, and other factors alter handover propensities between pairs of base stations.

Accordingly, in one respect, disclosed is a computing system for causing a first base station to use a base station identifier. In accordance with the disclosure, the computing system may include a processing unit, data storage, and program instructions stored in the data storage and executable by the processing unit to determine that (i) a first wireless coverage provided by a first base station overlaps a second wireless coverage provided by a second base station, (ii) a third wireless coverage provided by a third base station overlaps the second wireless coverage provided by the second base station, and (iii) an extent of handover between the third base station and the second base station is less than a predefined threshold extent, and based at least in part on the determination, cause the first base station to use the same base station identifier as the third base station.

In another respect, disclosed is a method of causing a first femtocell to use a base station identifier. In accordance with the disclosure, the method may involve determining that a first wireless coverage provided by a first femtocell overlaps a second wireless coverage provided by a macro base station. And the method may then involve identifying a second femtocell among a plurality of femtocells that each provide a respective wireless coverage that overlaps the second wireless coverage, where the identifying is based at least in part on an evaluation of which femtocell in the plurality has a lowest likelihood of handover with the macro base station. Then, based at least in part on the determining and the identifying, the method may involve causing the first femtocell to use the same base station identifier as the second femtocell.

Still further, in another respect, disclosed is a method of configuring a first base station to broadcast a coverage area identifier. In accordance with the disclosure, the method may involve determining that coverage provided by the first base station overlaps with coverage provided by a second base station. Then, of a plurality of third base stations that also provide coverage overlapping the coverage provided by the second base station, the method may involve identifying one or more third base stations having an extent of handover with the determined second base station that is below a threshold extent of handover. Based at least in part on the determining and the identifying, the method may involve selecting, as the coverage area identifier to be assigned to the first base station, a coverage area identifier that is also assigned to a particular one of the one or more identified third base stations, and configuring the first base station to use the selected coverage area identifier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present description is set forth by way of example only and numerous variations are possible. As such, those skilled in the art will appreciate that other arrangements and elements (e.g., machines, interfaces, functions, orders of functions, and groupings) can be used instead, and that some elements may be omitted altogether. Further, many of the elements described herein are functional entities that may be implemented as discrete or distributed components or in conjunction with other components, and in any suitable combination and location. Moreover, various functions described herein as being performed by one or more entities may be carried out by hardware, firmware and/or software. For instance, various functions may be carried out by a processor executing instructions stored in memory.

As noted above, example entities that may carry out one or more of the functions described herein include, without limitation, a base station or a network controller such as a mobility management entity, base station controller, or mobile switching center. Therefore, while in describing various functions, reference is made to "a network" performing those various functions, it will be understood that each of these functions could be performed by any suitable component of a network.

Figure 1:
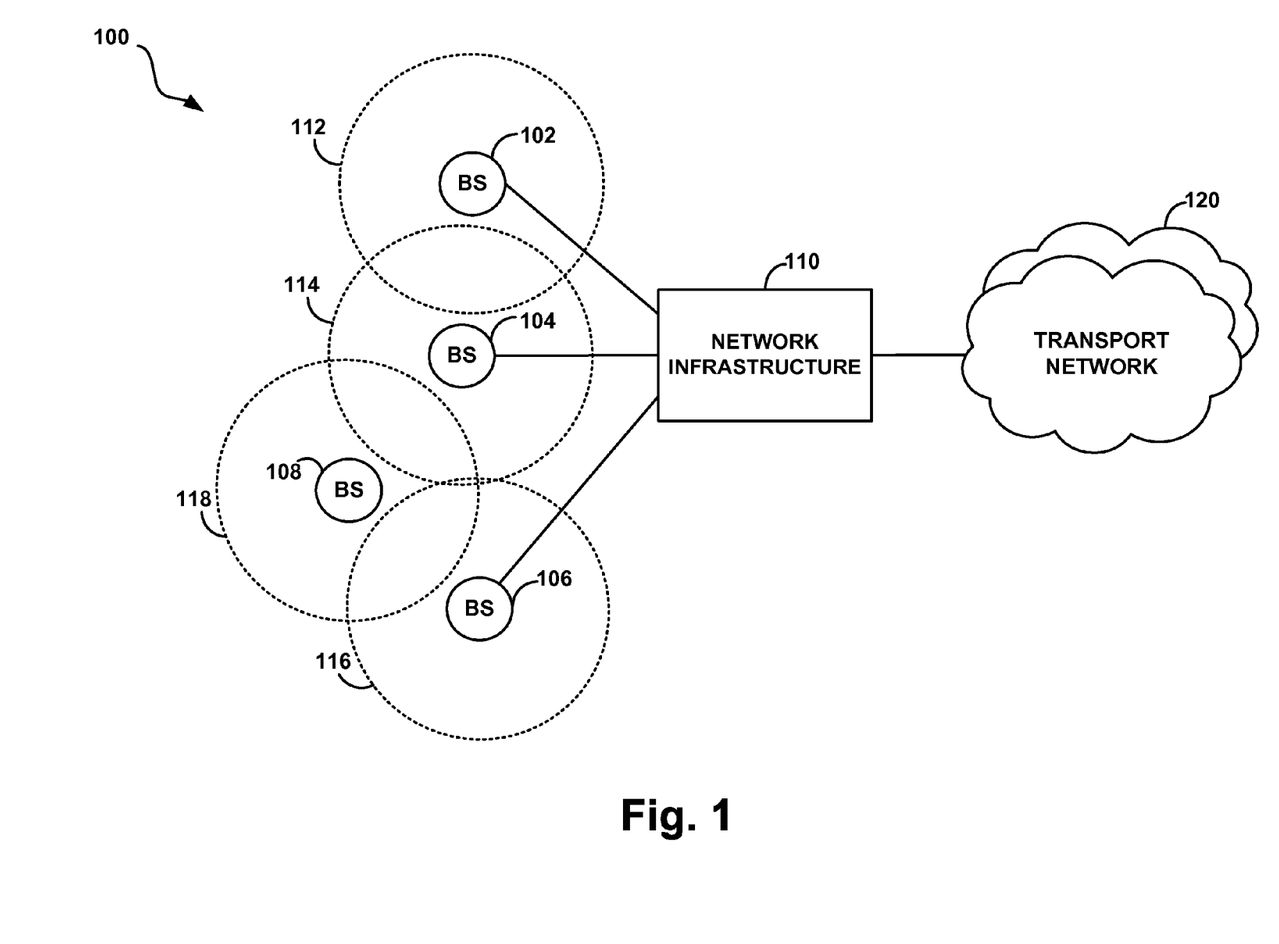
FIG. 1 is a simplified block diagram of an example communication network in which the present method can be implemented.

Referring to the drawings, FIG. 1 is a simplified block diagram of an example communication system 100 in which the present method can be implemented. Communication system 100 includes multiple representative base stations 102, 104, 106, and 108 interconnected with supporting network infrastructure 110 that provides connectivity with one or more transport networks 120 such as the PSTN and the Internet. Further, each base station is shown radiating to provide a respective coverage area. In particular, base stations 102, 104, 106, and 108 are shown radiating to provide coverage areas, 112, 114, 116, and 118, respectively.

In one example, the issue may be to identify which identifier to assign to base station 102 (i.e., a first base station). As shown, coverage area 112 provided by base station 102 overlaps coverage area 114 provided by base station 104 (i.e., a second base station). Further, base stations 106 and 108 (i.e., third base stations) provide coverage areas 116 and 118, respectively. Coverage areas 116 and 118 overlap coverage area 114, as shown. The present method may facilitate identifying a particular third base station that is unlikely to participate in handover with base station 104, such that the cellular network may assign to base station 102 the same coverage area identifier as the particular third base station.

Base stations 102, 104, 106, and 108 may take various forms, the specific details of which are not critical, and the base stations may differ in form from each other. By way of example, a representative base station may be a macro base station of the type commonly provided by a cellular wireless service provider for covering a broad area. Such a macro base station may typically include an antenna structure mounted on top of a tower or other structure. As another example, a representative base station may be a small-cell base station, such as a femtocell or picocell for instance, which typically has a smaller form factor and lower-power components for use to cover a smaller area than a typical macro base station.

As noted above, base stations 102, 104, 106, and 108 are shown communicatively linked with network infrastructure 110, which could be arranged to carry out aspects of the present method. In practice, network infrastructure 110 could include a network controller and/or an aggregation point, which may also function to provide or facilitate connectivity with the one or more transport networks 120. Alternatively, the network infrastructure could take other forms and serve other purposes or could be provided specifically for purposes of facilitating the present method.

The illustrated communication system 100 may operate in accordance with a particular radio access technology. By way of example, the system 100 may be a Long-Term Evolution (LTE) radio access network (RAN), in which case each base station may be an LTE eNodeB, and the supporting network infrastructure may include elements such as a mobility management entity, serving gateway and a packet data network gateway. As another example, the system may be a Code Division Multiple Access (CDMA) RAN, in which case each base station may be a CDMA base station known as a base transceiver station, and the supporting network infrastructure may include elements such as a base station controller, radio network controller, mobile switching center, and packet data serving node. Other examples are possible as well.

To facilitate carrying out the present method, each base station and/or the network infrastructure may maintain or have access to data indicating the configuration of the network. This configuration data may include location data indicating the geographic location of each base station, as determined through GPS location determination and/or through manual entry. The network may update the location data as base stations are added, removed, modified, or reconfigured. For instance, during registration of a base station with the network, the network may receive an indication of the geographic location of the base station that is being registered.

Further, the configuration data may include neighbor list data that specifies neighbor relationships between various base stations. In practice, for instance, the neighbor list data may include a neighbor list respectively for each base station, specifying neighboring base stations to which WCDs served by the base station could potentially hand over. Such a neighbor list may further specify various information about each neighbor, such as the respective geographic location of the neighbor and the respective coverage area identifier assigned to the neighbor.

Like the location data, the network may update the neighbor list data as base stations are added, removed, modified, or reconfigured. Updating the neighbor list data of a particular base station may involve identifying base stations that provide wireless coverage overlapping the wireless coverage provided by the particular base station. For example, the network may determine that wireless coverage provided by the particular base station overlaps respective coverage of each identified base station. The network may base such determinations on one or more of a variety of factors that indicate overlapping coverage. For instance, the determination may be based on pilot signals broadcasted by nearby base stations and received by the particular base station (or on pilot signals broadcasted by the particular base station and received by nearby base stations). Alternatively, the determination may be based on geographic distances from the particular base station to nearby base stations (which the network may store in location data, as noted above).

In practice, the arrangement shown in FIG. 1 may exist at a particular moment in time. As noted above, the configuration of the network may change over time, as base stations are added, removed, modified, or reconfigured. Further, changing external conditions may alter various performance characteristics of the network, which may in turn affect relationships between base stations. Thus, at a particular moment in time, coverage areas 112, 116, and 118 may overlap coverage area 114. In some embodiments, the present method may be carried out in response to detecting one or more changes in the network resulting in this configuration, such as in response to input indicating implementation of one or more such changes, and/or in response to otherwise detecting the occurrence of one or more such changes and/or the resulting configuration.

For example, a change in communication system 100 may necessitate assigning or re-assigning the coverage area identifier of base station 102, such as when base station 102 registers with communication system 100. During registration of base station 102, communication system 100 may identify the neighbors of base station 102, such as by determining that coverage provided by base station 102 overlaps coverage provided by other base stations (e.g., base station 104).

Then, to determine which coverage area identifier to assign to base station 102, the communication system 100 may determine which coverage area identifiers are already assigned to base stations near base station 102 (e.g., base stations 104, 106, and 108). As noted above, coverage area identifiers are typically re-used within a network. However, in an attempt to avoid identifier conflict, the network may allocate unique coverage area identifiers among base stations that may target one another for handover. Accordingly, the communication system 100 may determine which coverage area identifiers are assigned to base station 102's neighbors (e.g., base station 104). Further, since base station 104 may need to distinguish between base station 102 and its other neighbors, communication system 100 may also determine which coverage area identifiers are assigned to the neighbors of base station 104 (e.g., base stations 106 and 108). After determining the coverage area identifiers in use by these nearby base stations, communication system 100 may select, for assignment to base station 102, a coverage area identifier that has not been assigned to any of these base stations.

However, as noted above, in some circumstances, a unique coverage area identifier may be unavailable for assignment to base station 102. Such unavailability may necessitate assigning the same identifier to base station 102 as assigned to another nearby base station, such as base station 106 or base station 108. As shown in FIG. 1, both base station 106 and base station 108 are both neighbors of base station 104 and are therefore candidates for selection. Ultimately, communication system 100 may select one of these candidates for selection and assign the same identifier to base station 102 as assigned to the selected base station. However, before assigning an identifier to base station 102, communication system 100 may attempt to determine whether to assign base station 102 the same base station identifier as base station 106 or as base station 108.

To determine which identifier to assign to base station 102, communication system 100 may evaluate how likely WCDs are to handover between base station 104 and base station 106 and also how likely base station are to handover between base station 104 and base station 108. Communication system 100 may evaluate the likelihood of handover between base station 104 and base station 106 based on the respective extent that WCDs have handed over between base station 104 and base station 106 in the past. And communication system 100 may evaluate the likelihood of handover between base station 104 and base station 108 based on the respective extent that WCDs have handed over between base station 104 and base station 108 in the past.

To facilitate an evaluation of handover likelihood, each base station and/or the network infrastructure may maintain or have access to data indicating the handover history of each base station. Such a handover history may be a record containing entries listing each handover that a given base station has participated in. Each entry may indicate information about the handover, such as the time and date that the handover took place and the source and/or target of the handover. So that the record may act as a handover history, entries in the record may be kept for a period of time, such as six months or a year.

Then, by reference to the handover history of base station 104 for instance, communication system 100 may determine a first metric that indicates the extent of handover between base station 104 and base station 106 and a second metric that indicates the extent of handover between base station 104 and base station 108. The metrics may indicate the respective extents of handover in different ways. For example, the first metric may indicate the total number of handovers between base station 104 and base station 106, and the second metric may indicate the total number of handovers between base station 104 and base station 108. Alternatively, the first metric may indicate the average daily number of handovers between base station 104 and a base station 106 and, the second metric may indicate the average daily number of handovers between base station 104 and a base station 108.

In some cases, the cellular network may evaluate the extent of handover over a time period. For instance, the network may evaluate the total number of handovers between base station 104 and the base station 106 over the past week, and the total number of handovers between base station 104 and the base station 108 over the same time period. In other cases, the extent of handover between base station 104 and base station 106 may be indicated by reference to the extent of handover between base station 104 and base station 108, and vice versa. For example, the first metric may be a ratio comparing the number of handovers between base station 104 and base station 106 to the total number of handovers that base station 104 participated in overall. Likewise, the second metric may be a ratio comparing the number of handovers between base station 104 and base station 108 to the total number of handovers that base station 104 participated in overall. Many other metrics to indicate the extent of handover between base stations are possible as well.

Alternatively, communication system 100 may use geographic distances to evaluate the respective likelihood of handover between base station 104 and base station 106 and also between base station 104 and base station 108. As noted above, to facilitate carrying out the present method, each base station and/or the network infrastructure may maintain or have access to location data indicating the geographic location of each base station. By reference to such location data, communication system 100 may determine, as the first metric, the geographic distance from base station 104 to base station 106 and, as the second metric, the geographic distance from base station 104 to base station 108. A greater geographic distance from base station 104 may indicate a lower likelihood of handover. For instance, a relatively greater geographic distance from base station 104 to base station 108 than from base station 104 to base station 106 may indicate that base station 108 is relatively less likely to handover with base station 104 than base station 106.

Based at least in part on the determinations of the likelihoods of handover, the communication system 100 may select either base station 106 or base station 108. And the communication system 100 may assign to base station 102 the same coverage area identifier as assigned to the selected base station. The selecting of the base station may be based at least in part on the determined first and second metrics. In some examples, the communication system 100 may compare the determined first and second metrics against one another.

As one example, communication system 100 may determine that the extent of handover between base station 104 and base station 106 (or between base station 104 and base station 108) is less than a predefined threshold extent of handover and then select base station 106 (or 108) based at least in part on that determination. The predefined threshold extent may be set at any suitable level that indicates a relatively low extent of handover, such as at less than 1% of total handovers or at less than five handovers per day, among other examples.

Alternatively, communication system 100 may select the base station having the lowest extent of handover with base station 104. For instance, as noted above, communication system 100 may determine the extents of handover between base station 104 and base station 106 and between base station 104 and base station 108. Then, communication system 100 may determine which of base station 106 and base station 108 has the lowest extent of handover with base station 104, and select the base station having the lowest extent of handover.

Among base station 106 and 108, communication system 100 may select the base station having the furthest geographic location from base station 104. For instance, as noted above, communication system 100 may determine respective geographic distances from each of base station 106 and base station 108 to base station 104. Then, communication system 100 may determine which of base station 106 and base station 108 is located at the furthest geographic distance from base station 104, and select that base station.

In some cases, communication system 100 may select the base station based on a combination of metrics. For instance, communication system 100 may identify two or more base stations having an extent of handover with base station 104 that is under a predefined threshold extent. Then, among those identified base stations, communication system 100 may select the base station having the lowest extent of handover with base station 104 or the base station having the furthest geographic distance from base station 104, among other examples.

After selecting base station base station 106 or base station 108, communication system 100 may then cause base station 102 to use the same coverage area identifier as the selected base station. For instance, communication system 100 may assign to base station 102 the same coverage area identifier as assigned to base station 106. Base station 102 may then use the coverage area identifier in various ways.

In one example, the use of the coverage area identifier by base station 102 may involve broadcasting the identifier. For example, in operation, coverage area 112 (provided by base station 102) may define a pilot channel or reference channel on which base station 102 may broadcast a pilot signal or reference signal that WCDs may detect as an indication of coverage and may measure to determine coverage strength. Further, coverage area 112 may define a control channel that carries various overhead messages, such as system information blocks or the like, specifying characteristics and operational parameters of the coverage area. The coverage area identifier assigned to base station 102 may be indicated by the pilot or reference signal or specified in another overhead broadcast message or signal.

WCDs may then scan for pilot or reference signals and detect the signal broadcasted by base station 102. WCDs may then determine for base station 102 a signal level and corresponding coverage area identifier. Based at least in part on these determined signal levels and corresponding coverage area identifiers, the WCDs may then engage in attachment or handover with base station 102.

As noted above, the present method may have application to femtocells. At least in part, such application may arise from the typical arrangement of macro base stations and femtocells in a cellular wireless network, in which the wireless coverage of a macro base station may overlap the wireless coverage of a plurality of femtocells.

Figure 2:
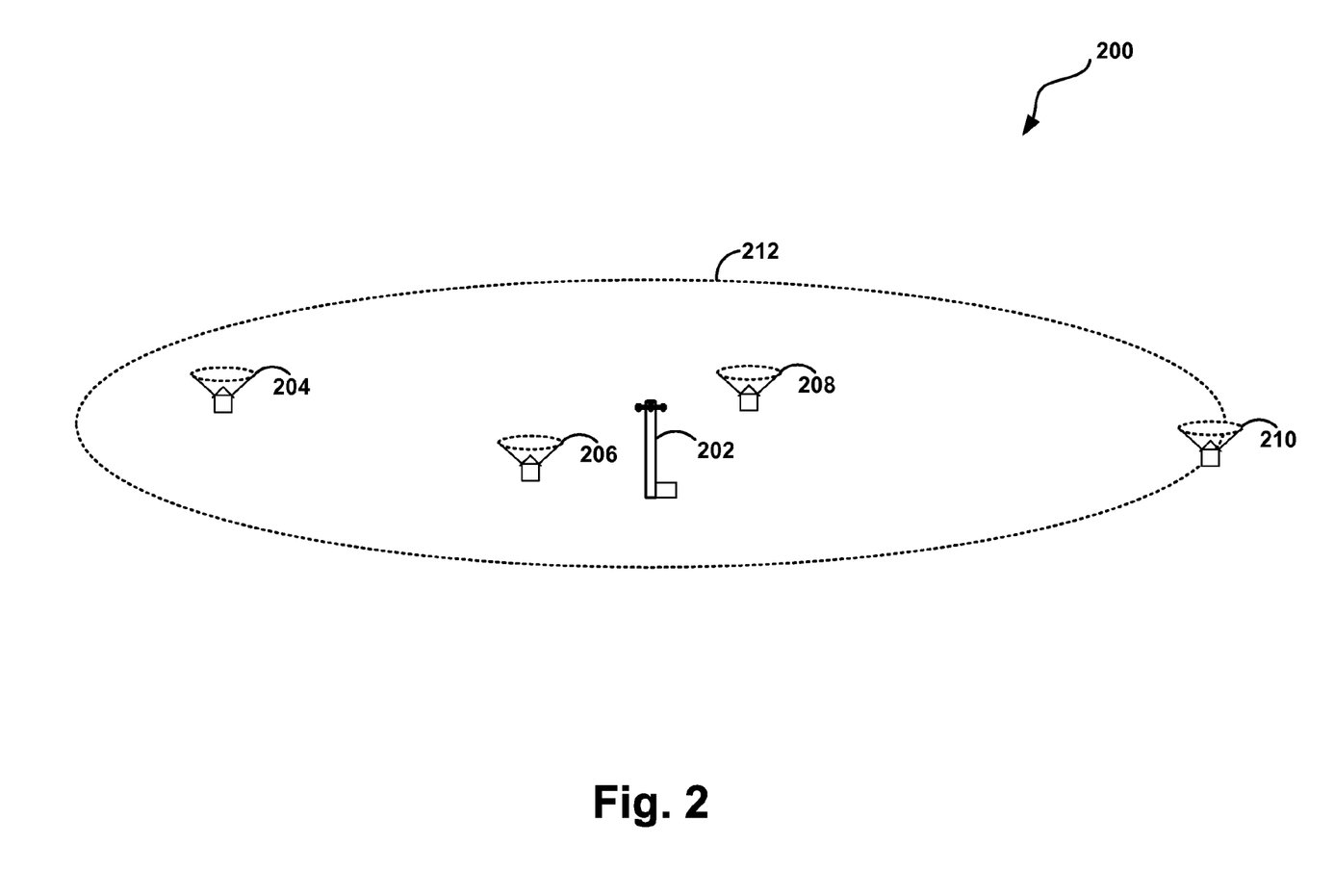
FIG. 2 is an illustration of another example communication network in which the present method can be implemented.

FIG. 2 illustrates a simplified example communication system 200 in which an example method may be implemented. Communication system 200 includes a macro base station 202 and multiple representative femtocells 204, 206, 208, and 210. Macro base station is shown providing wireless coverage 212. Femtocells 204, 206, 208, and 210 each provide a respective wireless coverage. They are represented by their respective wireless coverage in FIG. 2, as shown. Further, in FIG. 2, wireless coverage 212 of macro base station 202 overlaps the wireless coverage of femtocells 204, 206, 208, and 210.

Consider, for example, a change to communication system 200 that necessitates assigning or re-assigning the base station identifier of femtocell 204. Further, in the present example, communication system 200 has designated for assignment to femtocells only three base station identifiers. These designated base station identifiers are presently assigned to femtocells 206, 208, and 210, so a unique base station identifier for femtocell 204 is unavailable. In such a situation, communication system 200 may cause femtocell 204 to use the same base station identifier as one of femtocell 206, 208, or 210 based on which femtocell is unlikely or least likely to handover with macro base station 202.

Before causing femtocell 204 to use the same base station identifier as one of femtocell 206, 208, or 210, communication system 200 may determine which macro base station, if any, is providing wireless coverage that overlaps the wireless coverage provided by femtocell 204. In some cases, such a determination may be based at least in part upon respective geographic distance from femtocell 204 to macro base stations within the network. For instance, femtocell 204 may be located within a predefined range of signal propagation from macro base station 202 such that the communication system may assume that the wireless coverage of macro base station 202 overlaps the wireless coverage of femtocell 204. Alternatively, femtocell 204 may receive a broadcasted pilot or reference signal from macro base station 202 and, based on that received signal, report to the communication system an indication of the received signal strength and the coverage area identifier of macro base station 202. Then, based at least in part on this received indication, the communication system may determine that the wireless coverage of macro base station 202 overlaps the wireless coverage of femtocell 204.

Communication system 200 may then select a particular femtocell that provides wireless coverage that overlaps the wireless coverage of macro base station 202, but is unlikely to hand over with macro base station 202. To identify candidates for the selecting of the particular femtocell, the communication system may determine which femtocells provide wireless coverage that overlaps the wireless coverage of macro base station 202. Then, as discussed above, the communication system may evaluate respective likelihood of handover of one or more of the determined femtocells with the macro base station, such as by determining one or more metrics. For instance, the communication system may determine a respective extent of handover with macro base station 202, by determining a respective geographic distance from the femtocell to macro base station 202, or by determining one or more other indications of handover likelihood.

Then, based at least in part on the determined metrics, the communication system 202 may select the particular femtocell. For instance, communication system 200 may select femtocell 210 if that femtocell has the lowest extent of handover with macro base station 202 among femtocells 206, 208, and 210 (which may result from being located furthest among these femtocells from macro base station 202). The communication system may then configure femtocell 204 to use the same base station identifier as femtocell 210.

Figure 3:
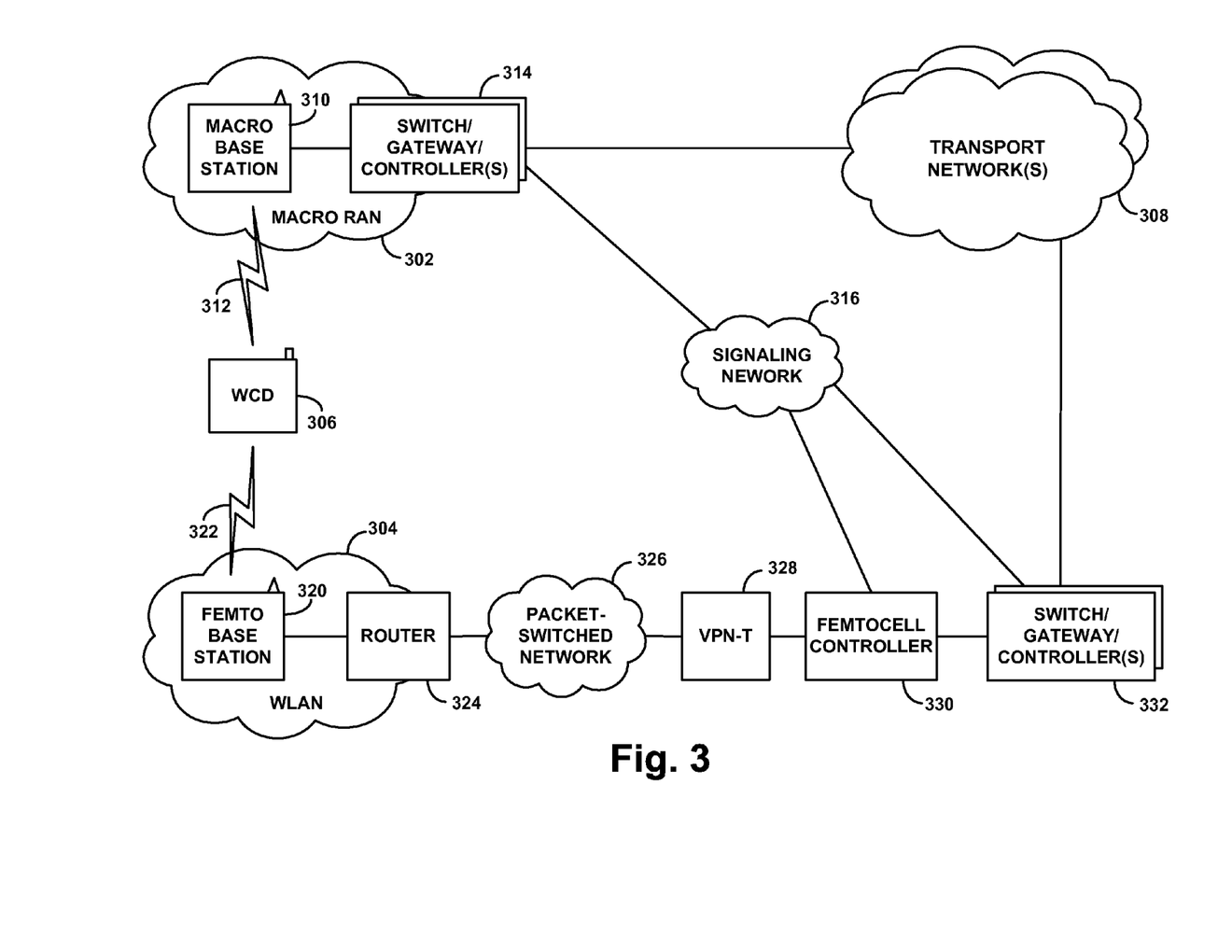
FIG. 3 is a simplified block diagram of an example network arrangement in which the present method can be implemented.

FIG. 3 is next a simplified block diagram of an example network arrangement that includes a combination of a macro base station and a femto base station (femtocell), which shows some of the components that may be included in a communication network to facilitate implementation of the present method. By way of example, components in FIG. 3 could represent components of the example communication networks of FIG. 1 or FIG. 2 to carry out features such as those described above.

The example network arrangement of FIG. 3 includes a combination of a macro base station and a femto base station (femtocell). As shown, the arrangement includes a representative macro radio access network (macro RAN) 302 and a representative wireless local area network (WLAN) 304, both arranged to serve a representative WCD 306 and to provide the WCD with access to one or more transport networks 308 such as the PSTN and/or the Internet for instance.

In practice, macro RAN 302 may be owned and operated by a wireless service provider, such as a cellular carrier for instance, and a user of WCD 306 may subscribe to service with that wireless service provider. WLAN 304, on the other hand, may be owned and operated by another entity, such as the user of the mobile station for instance. Alternatively, the macro RAN 302 and WLAN 304 may be owned and/or operated by the same entity or by various other entities.

As shown in FIG. 3, the macro RAN 302 includes a macro base station 310 (perhaps one of many), which would typically include an antenna configuration and associated equipment for radiating to define one or more coverage areas in which the WCD 306 can wirelessly communicate with the macro base station 310 over an air interface 312. Macro base station 310 (which may also be referred to as an access node, an eNodeB, an access point, or the like) may operate according to one or more defined air interface protocols, such as CDMA, LTE, WiMAX, GSM, WIFI, BLUETOOTH, or any other protocol now known or later developed. Further, WCD 306 may be arranged to operate according to the same air interface protocol, so that the WCD can communicate with the macro base station 310 and gain access to transport network(s) 308 via the macro RAN 302.

Macro RAN 302 further includes various entities 314 such as switches, gateways, and controllers that may facilitate providing connectivity with transport network(s) 308 and may further help to control aspects of macro RAN operation, such as registration and de-registration of mobile stations for instance. By way of example, the macro RAN 302 may include a base station controller, a radio network controller, a mobile switching center, a soft-switch, a media gateway controller, a packet data serving node, a serving gateway, a packet data network gateway, and/or a mobility management entity for instance, which may function to provide connectivity between macro base station 310 and transport network(s) 308. As shown, one or more of entities 324 may also be coupled with a signaling network 316 to facilitate communication with additional entities.

Depending on the implementation, some or all of the entities 314 or other entities may be considered to be part of the macro RAN 302 and may interwork with the macro base station to cooperatively define a macro base station system. Alternatively, the macro base station itself may be considered a macro base station system.

WLAN 304 is shown including a femto base station 320 (which may also be referred to as a femtocell, microcell, picocell, low cost Internet base station, personal cellular base station, or by other names). Femto base station 320 may be essentially a small scale version of macro base station 302, including an antenna configuration and associated equipment for radiating to define one or more coverage areas in which the WCD 306 can wirelessly communicate with the femto base station 320 over an air interface 322, and operating according to one or more defined air interface protocols such as those noted above for instance. Femto base station 320 may conveniently be the size of a typical WIFI access point, suitable for positioning in a home, office, or other location, and may be provided (e.g., sold or otherwise distributed) by the same wireless service provider that owns and operates macro base station, as a value-added device to help subscribers obtain enhanced coverage and service.

As shown, the femto base station 320 is coupled with a router 324, which provides connectivity (e.g., through one or more nodes such as a cable modem, DSL modem, or the like) with a broadband packet-switched network 326 such as the Internet. In turn, coupled with or accessible via network 316 is then a virtual private network terminator (VPN-T) 328, which is communicatively linked in turn with a femtocell controller 330 that connects with one or more entities 332 such as switches, gateways, and controllers of the type noted above for instance. Entities 332 may then provide connectivity with transport network(s) 308 and may further connect with signaling network 316. In practice, some or all of entities 332 may be one or more of entities 324. Likewise, other illustrated components could be combined, distributed, or otherwise modified.

With this arrangement, the femto base station 320 may have an Internet Protocol (IP) address (statically or dynamically assigned) for communication on network 316 or may operate through network address translation by router 324 to communicate on network 316. Upon power on and/or at another time, the femto base station 320 may programmatically communicate over network 326 with VPN-T to establish a VPN through which the femto base station 320 can communicate over network 326. Through that VPN, femto base station 320 may then communicate with a server such as a femtocell controller 330, and via femtocell controller 330 with entities 332. Consequently, femto base station 320 may be in communication with entities 332 (through a VPN connection over broadband network 326) much the same as macro base station 310 is in communication with entities 314.

Depending on implementation, various entities may interwork with the femto base station 320 to cooperatively define a femto base station system. For instance, the femtocell controller 330 and/or various ones of entities 332 may interwork femto base station to cooperatively define a femto base station system. Alternatively, femto base station 320 itself may be considered a femto base station system.

Figure 4:
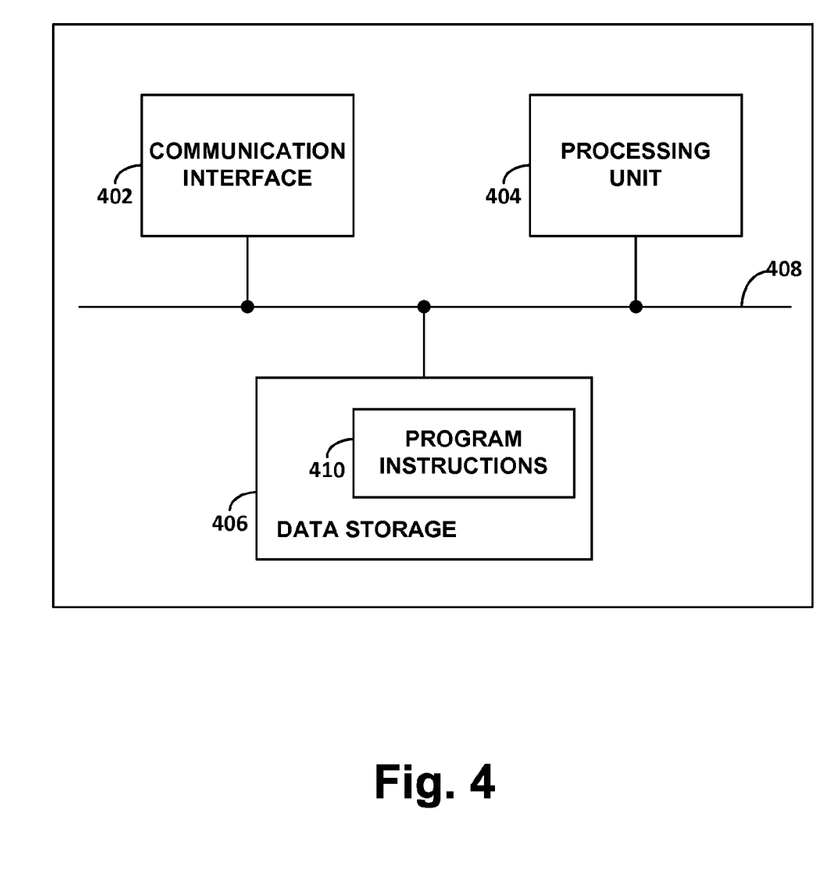
FIG. 4 is a simplified block diagram of a computing system for carrying out the present method.

FIG. 4 is next a simplified block diagram of an example computing system, showing components that may be included in such a system to carry out this method. For instance, the computing system may represent a component of a base station or a network controller such as a mobility management entity, base station controller, or mobile switching center. As shown, the computing system includes a communication interface 402, a processing unit 404 and data storage 406, all of which may be integrated together or interconnected by a system bus, network, or other communication mechanism 408.

Communication interface 402 may be a network interface through which to engage in network communication, such as to receive reports of changes in network configuration, and to transmit to base stations a directive for the base station to use a certain coverage area identifier. Processing unit 404 may then comprise one or more general purpose processors (e.g., microprocessors) and/or one or more special purpose processors (e.g., application specific integrated circuits). And data storage 406 may comprise one or more volatile and/or non-volatile storage components, such as magnetic, optical, or flash storage.

Data storage in the example computing system stores program instructions 410 that are executable by the processing unit 404 to carry out various functions of the present method. Thus, in an example implementation, the program instructions may be executable by the processing unit to cause a first base station to use a base station identifier.

In line with the discussion above, the program instructions may thus be executable by the processing unit to determine that (i) a first wireless coverage provided by a first base station overlaps a second wireless coverage provided by a second base station, (ii) a third wireless coverage provided by a third base station overlaps the second wireless coverage provided by the second base station, and (iii) an extent of handover between the third base station and the second base station is less than a predefined threshold extent. Based at least in part on the determining, the program instructions may be further executable by the processing unit to cause the first base station to use the same base station identifier as the third base station.

Figure 5:
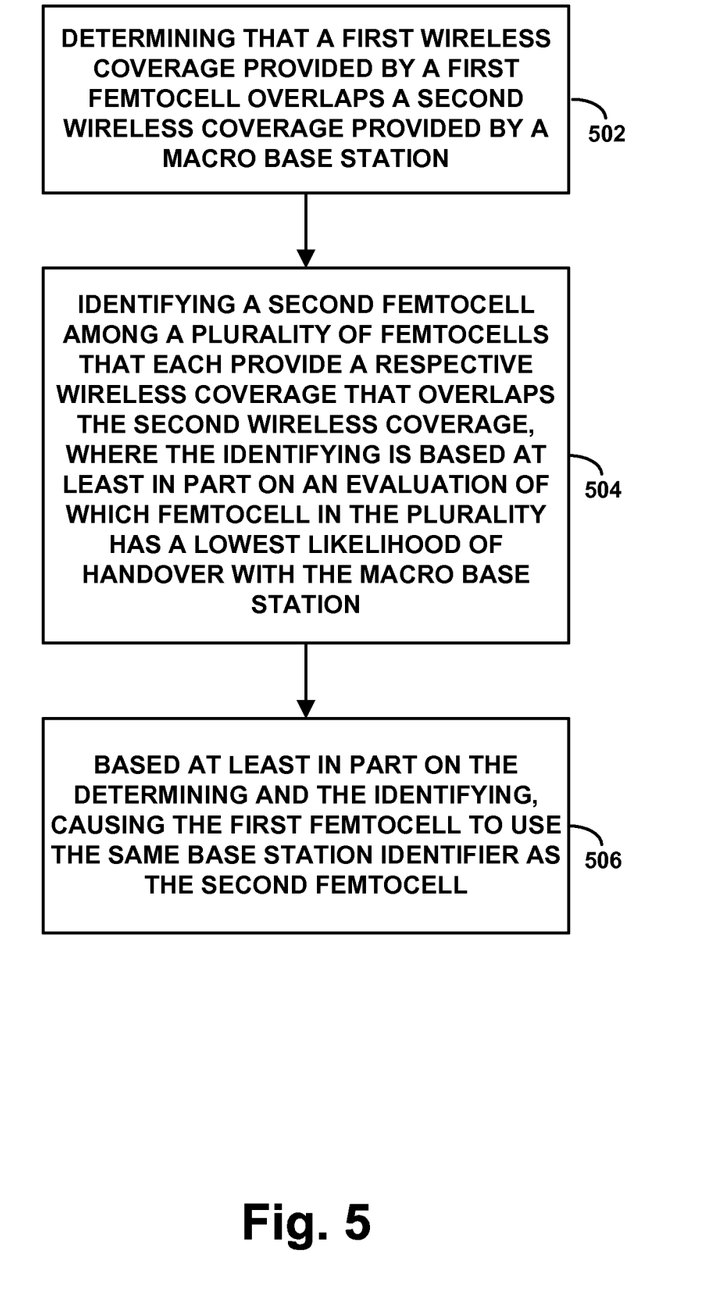
FIG. 5 is a flow chart depicting functions that can be carried out in accordance with an implementation of the present method.

FIG. 5 is next a flow chart depicting functions that can be carried out by a computing system in accordance with the present method, to cause a first femtocell to use a base station identifier.

As shown in FIG. 5, at block 502, the method involves the computing system determining that a first wireless coverage provided by a first femtocell overlaps a second wireless coverage provided by a macro base station. At block 504, the method involves the computing system identifying a second femtocell among a plurality of femtocells that each provide a respective wireless coverage that overlaps the second wireless coverage, where the identifying is based at least in part on an evaluation of which femtocell in the plurality has a lowest likelihood of handover with the macro base station. Further, at block 506, based at least in part on the determining and the identifying, the method involves the computing system causing the first femtocell to use the same base station identifier as the second femtocell.

Figure 6:
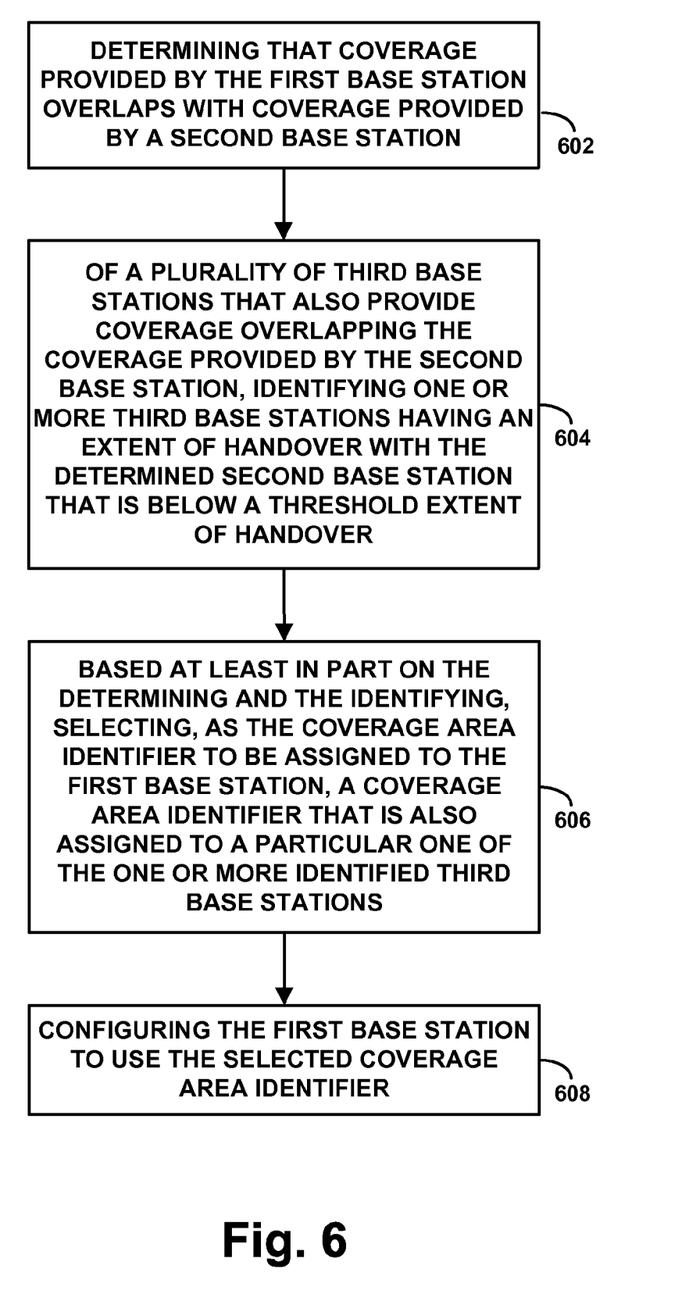
FIG. 6 is another flow chart depicting functions that can be carried out in accordance with an implementation of the present method.

Finally, FIG. 6 is another flow chart depicting functions that can be carried out in accordance with the present method to configure a first base station to broadcast a coverage area identifier.

As shown in FIG. 6, at block 602, the method involves determining that coverage provided by the first base station overlaps with coverage provided by a second base station. At block 604, of a plurality of third base stations that also provide coverage overlapping the coverage provided by the second base station, the method involves identifying one or more third base stations having an extent of handover with the determined second base station that is below a threshold extent of handover. At block 606, based at least in part on the determining and the identifying, the method involves selecting, as the coverage area identifier to be assigned to the first base station, a coverage area identifier that is also assigned to a particular one of the one or more identified third base stations. Then, at block 608, the method involves, configuring the first base station to use the selected coverage area identifier.

Exemplary embodiments have been described above. Those skilled in the art will understand, however, that changes and modifications may be made to these embodiments without departing from the true scope and spirit of the invention.

We claim:

1. A computing system for causing a first base station to use a base station identifier, the computing system comprising:
   a processing unit;
   data storage; and
   program instructions stored in the data storage and executable by the processing unit to:
   determine that (i) a first wireless coverage provided by a first base station overlaps a second wireless coverage provided by a second base station, (ii) a third wireless coverage provided by a third base station overlaps the second wireless coverage provided by the second base station, and (iii) an extent of handover between the third base station and the second base station is less than a predefined threshold extent; and
   based at least in part on the determining, cause the first base station to use the same base station identifier as the third base station.

2. The computing system of claim 1, wherein the program instructions are further executable by the processor to:
   receive, during registration of the first base station with a radio access network, an indication of a geographic location of the first base station,
   wherein determining that the first wireless coverage overlaps the second wireless coverage is based at least in part on the received indication of geographic location of the first base station.

3. The computing system of claim 1, wherein the first base station has a geographic location, and wherein the program instructions are further executable by the processor to:
   determine that, among a plurality of base stations that each provide a respective wireless coverage that overlaps the second wireless coverage, a particular base station is most distant from the geographic location of the first base station; and
   based on the determining, select the particular base station as the third base station.

4. The computing system of claim 1, wherein the program instructions are further executable by the processor to:

determine that, among a plurality of base stations that each provide a respective wireless coverage that overlaps the second wireless coverage, a particular base station has a least extent of handover with the second base station; and based on the determining, select the particular base station as the third base station.

5. The computing system of claim 1, wherein determining that the particular base station has the least extent of handover with the second base station comprises:

determining a respective extent of handover between each base station in the plurality of base stations and the second base station based on a respective handover history of the base station with the second base station; and determining that, among the determined extents of handover of base stations in the plurality of base stations, the particular base station has the least extent of handover with the second base station.

6. The computing system of claim 1, wherein causing the first base station to use the same base station identifier as the third base station comprises:

causing the first base station to broadcast the same base station identifier as broadcasted by the third base station.

7. The computing system of claim 1, wherein the first base station is a femtocell, and wherein the second base station is a macro base station.

8. The computing system of claim 1, wherein the first base station, the second base station, and the third base station are respective evolved NodeBs of a Long-Term Evolution radio access network.

9. A method of causing a first femtocell to use a base station identifier, the method comprising:

determining that a first wireless coverage provided by a first femtocell overlaps a second wireless coverage provided by a macro base station;

identifying a second femtocell among a plurality of femtocells that each provide a respective wireless coverage that overlaps the second wireless coverage, wherein the identifying is based at least in part on an evaluation of which femtocell in the plurality has a lowest likelihood of handover with the macro base station; and based at least in part on the determining and the identifying, causing the first femtocell to use the same base station identifier as the second femtocell.

10. The method of claim 9, wherein the macro base station has a geographic location, the method further comprising:

before identifying the second femtocell among the plurality of femtocells, selecting the plurality of femtocells based at least in part on the geographic location of the macro base station.

11. The method of claim 9, wherein the base station identifier is a particular one of a plurality of base station identifiers designated for assignment to femtocells of a radio access network, the method further comprising:

determining that each base station identifier in the plurality of coverage area identifiers has been assigned to a femtocell of the plurality of second femtocells, wherein identifying the second femtocell is responsive to the determining.

12. The method of claim 9, wherein identifying the second femtocell comprises:

for each femtocell in the plurality of femtocells, determining, based on data that indicates handover history of the femtocell, a respective extent of handover with the macro base station; and determining, based on the determined extents of handover, that the second femtocell has the lowest likelihood of handover with the macro base station.

13. The method of claim 9, wherein identifying the second femtocell comprises:

for each femtocell in the plurality of femtocells, determining, based on data that indicates geographic locations of the femtocells, a respective geographic distance of the femtocell from the macro base station; and determining, based on the determined geographic distances, that the second femtocell has the lowest likelihood of handover with the macro base station.

14. The method of claim 9, further comprising:

receiving, during registration of the first femtocell a radio access network, an indication of a geographic location of the first base station, wherein determining that the first wireless coverage provided by the first femtocell overlaps the second wireless coverage provided by the macro base station is based at least in part on the received geographic location of the first femtocell.

15. The method of claim 14, further comprising:

after receiving the indication of the geographic location of the first femtocell, determining, based on the received indication of the geographic location, that the macro base station is nearest to the first femtocell among a plurality of macro base stations that are within the radio access network.

16. A method of configuring a first base station to broadcast a coverage area identifier, the method comprising:

determining that coverage provided by the first base station overlaps with coverage provided by a second base station;

of a plurality of third base stations that also provide coverage overlapping the coverage provided by the second base station, identifying one or more third base stations having an extent of handover with the determined second base station that is below a threshold extent of handover;

based at least in part on the determining and the identifying, selecting, as the coverage area identifier to be assigned to the first base station, a coverage area identifier that is also assigned to a particular one of the one or more identified third base stations; and configuring the first base station to use the selected coverage area identifier.

17. The method of claim 16, further comprising:

receiving, during registration of the first base station with a radio access network, an indication of a geographic location of the first base station, wherein determining that the first wireless coverage overlaps the second wireless coverage is based at least in part on the received indication of geographic location of the first base station.

18. The method of claim 16, wherein the one or more third base stations is a plurality of third base stations, the method further comprising:

determining which third base station of the plurality of third base stations is most distant from the first base station; and selecting the determined third base station as the particular third base station.

19. The method of claim 16, wherein the one or more third base stations is a plurality of third base stations, the method further comprising:

determining which third base station of the plurality of third base stations has a lowest extent of handover with the second base station; and selecting the determined third base station as the particular third base station.

20. The method of claim 16, wherein configuring the first base station to use the selected coverage area identifier comprises:

sending a message, via a network, instructing the first base stations to adopt the selected coverage area identifier.

* * * * *